Jan. 14, 1936.  C. A. CAMPBELL  2,027,468

AIR BRAKE

Filed June 9, 1932  2 Sheets-Sheet 1

Inventor
Charles A. Campbell
By
Attorneys

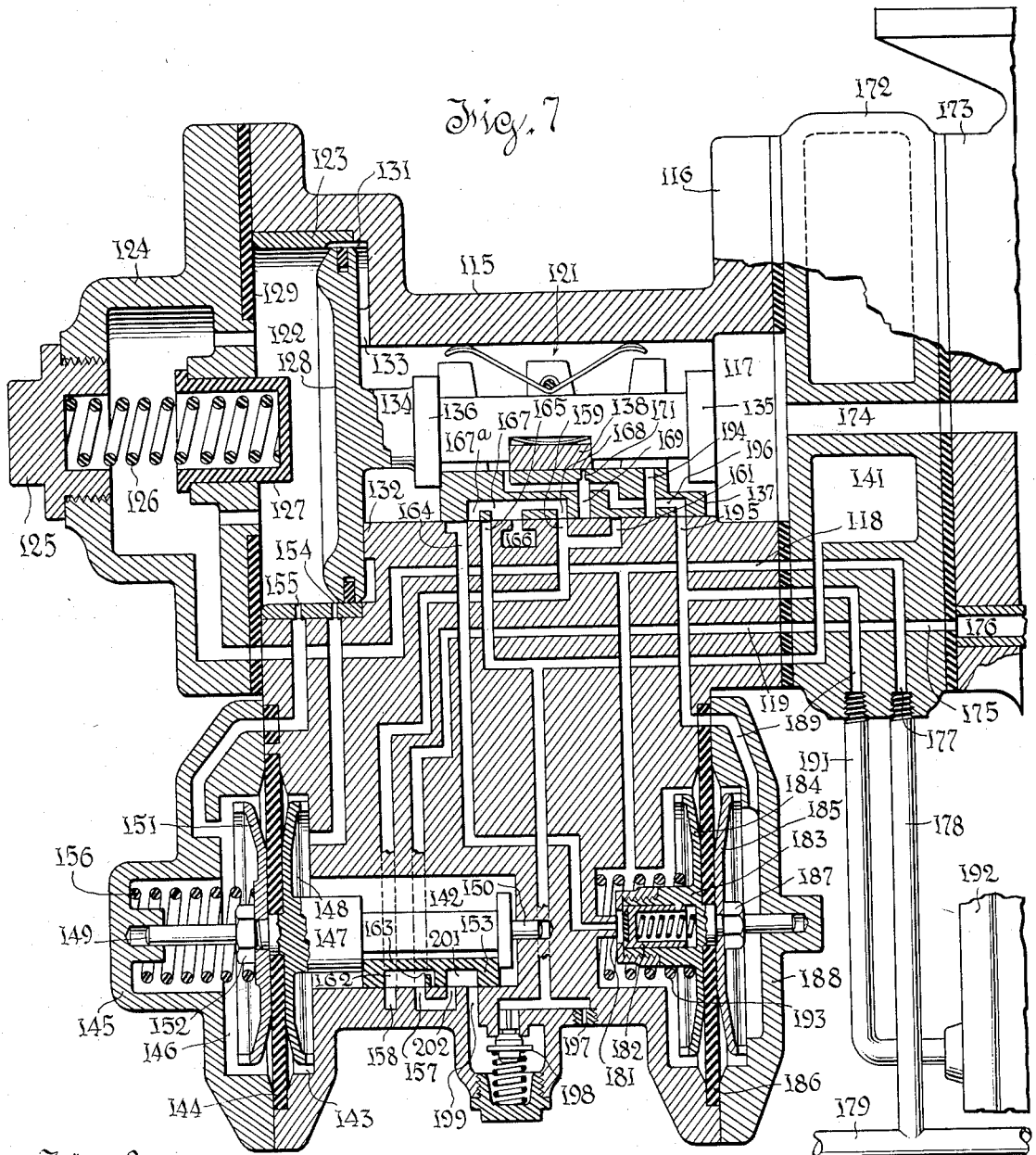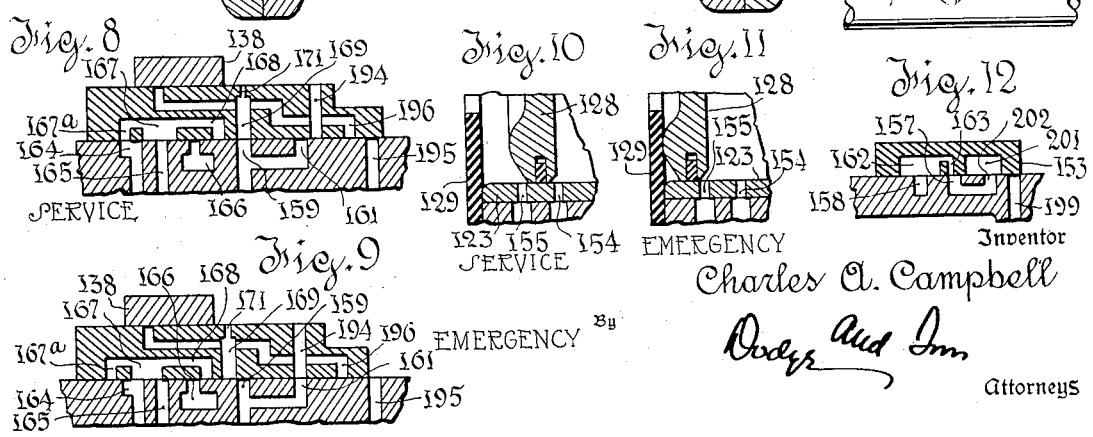

Patented Jan. 14, 1936

2,027,468

UNITED STATES PATENT OFFICE 2,027,468

AIR BRAKE

Charles A. Campbell, Watertown, N. Y., assignor to The New York Air Brake Company, a corporation of New Jersey Application June 9, 1932, Serial No. 616,325

31 Claims. (Cl. 303—35)

This invention relates to air brakes, and particularly to the mode of partially or completely counteracting the effects of the pressure gradient existing in a long and leaky brake pipe under running conditions.

The invention accomplishes the desired result by apparatus associated with each triple valve, and involves, in its preferred mechanical embodiment, the combination of a gradient neutralizing valve with a triple valve. The action of the device is first to delay somewhat the build-up of brake cylinder pressures in service at the forward end of the train, and second, in a more refined form of the invention, to insure more nearly equal service brake cylinder pressures throughout the length of long trains.

On a long train, some brake pipe leakage is inevitable and such leakage causes a progressive falling gradient of brake pipe pressure from the front to the rear of the train while the engineer's brake valve is in running position and the feed valve is functioning.

One result of such a pressure gradient is that the auxiliary reservoirs are charged to progressively lower pressures toward the rear end of the train.

With the system charged as just described, the initiation of a service reduction at the engineer's brake valve causes the quick service vents associated with the various triple valves to function serially over a very short time interval. This produces a definite pressure drop throughout the length of the brake pipe. The engineer's brake valve is left in service position only long enough to establish the desired pressure in the equalizing reservoir, and then is lapped. In lap position the feed valve is cut off from the brake pipe, and the equalizing discharge valve functions to reduce brake pipe pressure slowly to the value determined by the pressure established in the equalizing reservoir. Under such conditions, the pressure in the brake pipe quickly levels off and the pressure gradient which existed under running conditions, disappears.

After a service reduction of brake pipe pressure, the triple valves move to lap position in response to the relation between brake pipe pressure and auxiliary reservoir pressure, and irrespective of brake cylinder pressure. Since the brake pipe pressure is approximately uniform throughout the length of the train in service, and since the initial auxiliary reservoir pressures were progressively lower from the front toward the rear end of the train, the final brake cylinder pressures in service must decrease progressively from the front toward the rear end of the train. It is inevitable that the front brakes apply first, and if they also apply immediately with greater intensity, harsh slack action results.

The present invention, in its simplest embodiment, provides a secondary mechanism, called the gradient neutralizing valve for lack of a better name, which is conditioned as a result of the brake pipe pressure gradient above described to delay the build-up of brake cylinder pressure in a variable degree. At the front end of the train, flow to the brake cylinder is throttled over a considerable period. The duration of such delay period becomes less and less toward the rear of the train until it attains its minimum at the end or in the rear portion of the train.

With this simple arrangement, no attempt is made to equalize the final brake cylinder pressure, but the attainment of the high pressure at the front end of the train is so delayed that the initial application of the brakes is approximately the same throughout the length of the train, and harsh slack action is avoided.

This scheme can be arranged to operate with various types of quick service mechanism, but will be described hereinafter as applied to a quick service mechanism including a measuring chamber which is not vented until the brakes are released. Consequently, the quick service mechanism is of the non-repeating type, that is, it functions only on the first reduction in a split reduction application.

A further refinement of the invention contemplates an equalization or approximate equalization of the intensity of the service application throughout the length of the train. This result may be secured where a quick service measuring chamber is used, and involves the delivery to the brake cylinder of substantially all of the quick service air in the rear of the train and virtually none of the quick service air at the front of the train, the effect being graduated between these two limits.

Generally stated, the measuring chamber is provided with a bleed port, and the gradient neutralizing valve, when in position to delay build-up, isolates the measuring chamber from the brake cylinder, and when in position to permit rapid build-up, offers a direct connection past a one-way valve from the quick service measuring chamber to the brake cylinder. On cars at the front of the train where the gradient neutralizing valve remains in delay build-up position over a long period, the pressure in the measuring chamber established by quick service venting is completely or almost completely bled away before the gradient neutralizing valve shifts. At the rear of the train where the gradient neutralizing valve shifts after a relatively short period, practically all of the air vented from the brake pipe in quick service flows to the brake cylinder. Between these two limits, the action progressively varies and the result is to equalize or approximately equalize brake cylinder pressures throughout the length of the train, those at the rear being increased by the admission of greater amounts of quick service air.

Since the measuring chamber is not a closed chamber, but is vented to atmosphere, the quick service action is intermediate between that produced by a measuring chamber and that produced by an atmospheric vent. To terminate venting a quick service limiting valve, for which per se no novelty is here claimed since it forms the subject matter of a prior application Serial No. 517,606, filed February 21, 1931, is used to limit the amount which brake pipe pressure can be reduced by quick service venting. This valve is conditioned for operation by a standard pressure established during charging of the auxiliary reservoir.

To illustrate the possibility of using a supplemental reservoir for this purpose, and also for supplying additional air in emergency, such features are included, without however implying their necessary presence.

Two practical embodiments of the invention, simplified by the omission of unnecessary features, such as restricted recharge and release, are illustrated in the accompanying drawings.

It is to be understood that the use of emergency vent valves in conjunction with the triple valve is contemplated. It is known practice in the art to apply to the brake pipe on each car, one or more valves which are independent of the triple valve and which function on a rapid reduction of brake pipe pressure to vent the brake pipe at an emergency rate. The particular form of the emergency vent valve is not material, and as such valves are well known, it is unnecessary to illustrate them.

In the drawings:—

Figure 1:
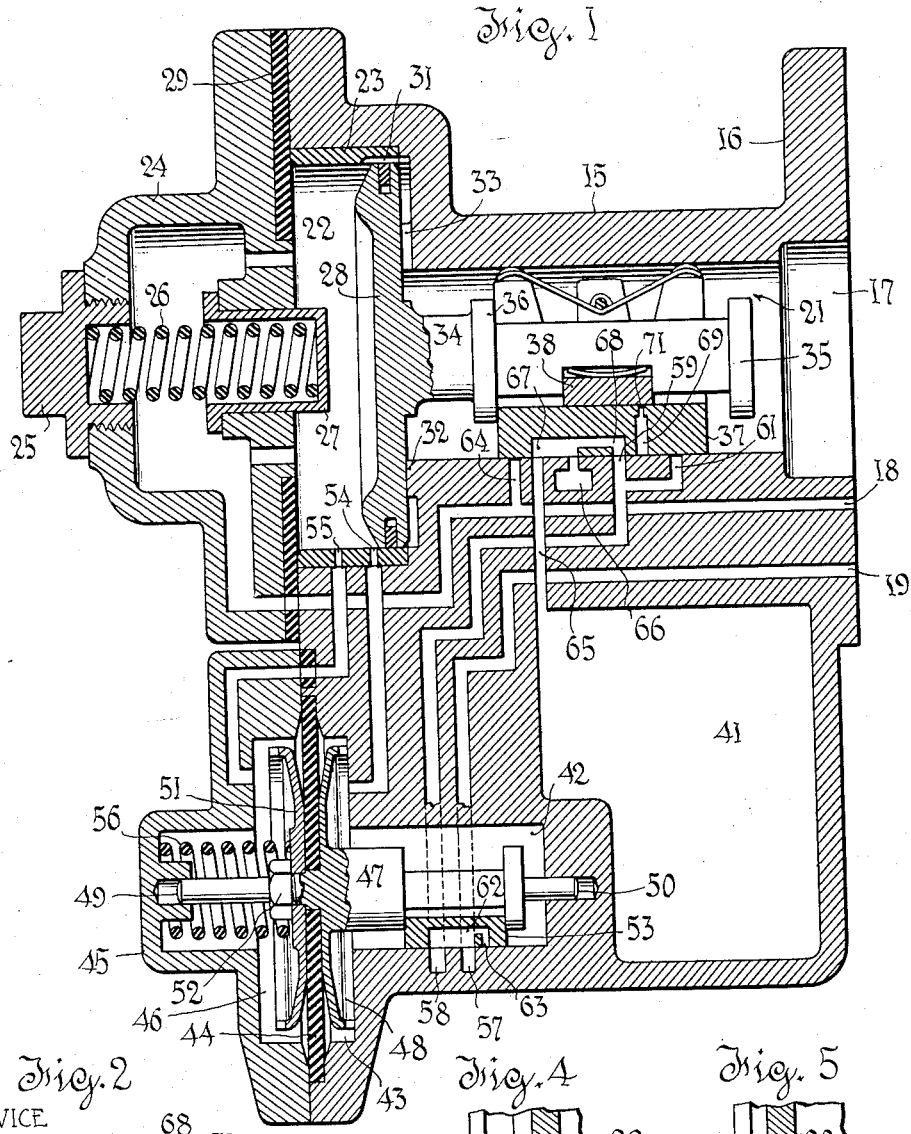
Fig. 1 represents a vertical axial section of a simple triple valve in combination with a gradient neutralizing valve which controls the rate of initial build-up of brake cylinder pressure in service. The triple valve is shown in release and recharge position, the valve element of the neutralizing valve is shown in non-restricting position.
Figure 2:
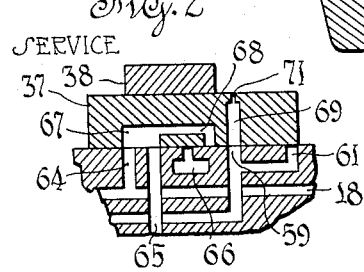
Fig. 2 is a fragmentary view of the slide valve with its seat and graduating valve, showing the parts in service position.

Fig. 7 is a view similar to Fig. 1 showing a simple triple valve in combination with a gradient neutralizing valve which not only controls the rate of flow to the brake cylinder, but also controls flow from the quick service measuring chamber to the brake cylinder. In this view, the triple valve is shown in release and recharge position, and the gradient neutralizing valve is shown in that position in which it permits free flow from the measuring chamber and from the auxiliary reservoir to the brake cylinder.

Fig. 8 is a fragmentary view of the slide valve with its seat and graduating valve with the parts in service position.

Fig. 9 is a similar view showing the parts in emergency position.

Fig. 10 is a fragmentary view showing the triple piston in service position.

Fig. 11 is a similar view showing the triple piston in emergency position.

Fig. 12 is a fragmentary view showing the valve element of the gradient neutralizing valve in that position in which it restricts flow from the auxiliary reservoir to the brake cylinder and interrupts flow from the measuring chamber to the brake cylinder.

In the drawings the showing is diagrammatic to some extent, that is, the ports are all drawn as if they lay in a common plane, in order to make them visible in a single view and in order to indicate readily on the different figures the occurrence of simultaneous flows. The ports can be, and commonly would be, otherwise located. The conventional details, such as bushings and bolts, which involve no inventive features, are omitted. The particular form of the device and the mechanical details are subject to variation in accordance with the preferences of the designer.

The body of the triple valve is indicated at 15, and is provided with a mounting flange 16. On the mounting face there is a passage 17 which leads to the auxiliary reservoir, a passage 18 which leads to the brake pipe, and a passage 19 which leads to the brake cylinder. The triple valve is illustrated as of the well known pipeless type intended to be mounted against a support formed with ports to register with the ports 17, 18, and 19, such ports being connected with the usual auxiliary reservoir, brake pipe, and brake cylinder.

Figure 5:
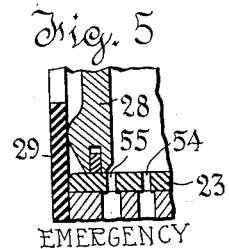
Fig. 5 is a similar view showing the piston in emergency position.
Figure 3:
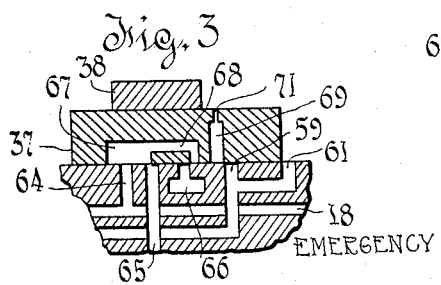
Fig. 3 is a similar view showing the parts in emergency position.

The passage 17 communicates directly with the usual slide valve chamber 21, which, in turn, communicates with the cylinder 22. The cylinder is provided with a bushing 23 and is closed at its outer (left hand side) by a front cap 24. The cap 24 is provided with a screw plug 25 which serves as a seat for spring 26. This reacts against a slide stop 27 whose function is to arrest the triple piston 28 in service position. If the spring 26 is overpowered, the piston moves to emergency position (see Fig. 5) in which it seals against a gasket 29. This gasket, as usual, also seals the joint between the body 15 and the front cap 24.

The brake pipe passage 18 reaches directly to the space within the front cap 24, and thence to the cylinder 22 to the left of piston 28. The bushing 23 is provided with a charging groove 31 of conventional form. Inward motion of the piston 28 is limited by the rim 32 which is provided with a charging notch 33. The piston stem 34 has a guiding spider 35 at its end, and a collar 36 between which a slide valve 37 is confined, a limited amount of lost motion being permitted. The graduating valve 38 is confined closely in a notch in the stem 34, and hence, is shifted relatively to the slide valve 37 as a result of the lost motion permitted the slide valve. The slide and graduating valves are held seated by the usual bow springs shown in the drawings.

Formed in the body 15 below the valve chamber 21 is a quick service measuring chamber 41. Also formed in the body 15 is a slide valve chamber 42 of the gradient neutralizing valve mechanism. This communicates directly with a diaphragm chamber 43. Clamped at its margin and extending across the left face of the chamber 43 is a flexible diaphragm 44. This diaphragm is held in place by a cap member 45 which encloses a chamber 46 to the left of the diaphragm 44.

There is a combined hub and stem member 47 which is formed with an abutment 48, whose convex side is presented to the diaphragm 44, and whose notched margin serves as a limit stop, in conjunction with the walls of chamber 43, to limit the motion of stem 47 to the right. The stem 47 has a reduced extension 49 which projects through the center of the diaphragm 44 and receives a thrust disc 51 similar to the disc 48. This presents a convex surface to the diaphragm 44 and serves as a limit stop controlling the motion of the member 47 to the left. A nut 52 holds the parts in assembled relation, clamping the diaphragm between the parts 48 and 51 and preventing leakage at this point. The tip of extension 49 works in a guide formed in the cap 45, as shown, and an extension 50 at the opposite end of stem 47 performs a similar guiding function.

Figure 4:
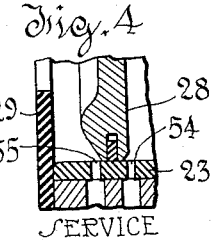
Fig. 4 is a fragmentary view showing the triple piston in service position.

The stem 47 is peripherally grooved to receive a slide valve 53 which coacts with a seat in the chamber 42 and is the valve element of the gradient neutralizing valve. The chamber 43 at the right of the diaphragm 44 is connected by a passage, clearly shown in the drawings, with a port 54 drilled through the piston bushing 23. The chamber 46 to the left of the diaphragm 44 is connected by a passage with a similar port 55. When the valve is in release position (Fig. 1), both ports 54 and 55 are open to brake pipe pressure, while in emergency position (Fig. 5), both ports are open to auxiliary reservoir pressure, but in service position (Fig. 4), the piston 28 which is then against the yielding stop 27, stands between the two ports, so that chamber 43 is at auxiliary reservoir pressure and chamber 46 is at brake pipe pressure.

A spring 56 reacts against the member 51 to urge the stem 47 to the right, so that at all times when the pressures in the chambers 43 and 46 are equalized, the stem will move to its right hand position. This is the condition during both release and emergency, but in service position, the spring 56 will be overpowered whenever auxiliary reservoir pressure predominates sufficiently over brake pipe pressure, as it will do when the triple valve first moves to service position.

The brake cylinder passage 19 leads to a port 57 in the seat of the valve 53. A port 58 in the same seat is connected by a passage with the service port 59 and emergency port 61 of the seat for slide valve 37. The slide valve 53 has a cavity 62 which freely connects ports 57 and 58 when valve 53 is in its right hand position, and a restricted extension 63 which connects ports 57 and 58 when the valve is in its left hand position.

Since the valve is to the right in release and emergency, free exhaust and rapid emergency flow are assured. Restricted flow occurs only during a part of service.

In the seat of slide valve 37 are the brake pipe quick service port 64 leading from brake pipe passage 18, the measuring chamber port 65 and the exhaust port 66 in addition to service port 59 and emergency port 61.

The slide valve 37 has a cavity 67 with extension 68 and a through port 69 which is the service port. This has a constriction 71 and is controlled by graduating valve 38.

The size of constriction 71 is such that after quick service venting has occurred, flow through 71 will reduce auxiliary reservoir pressure at the rate that brake pipe pressure is reduced by the engineer's brake valve. It follows that on short trains, the diaphragm 44 will respond only to the first reduction of a split reduction.

Constriction 71 should be small enough to ensure that the initial pressure differential acting on diaphragm 44 shall cause movement of valve 53 to delay position during quick service venting. Constriction 71, if made too small, will tend to cause valve 53 to respond in all service applications on short trains which is to be avoided. Between these limits the size of constriction 71 is subject to variation.

The operation of the structure shown in Figs. 1-6 can now be briefly traced.

*Release and recharge*

In release position the auxiliary reservoir is charged and the brake cylinder and quick service chamber are exhausted in a familiar manner. The ports 54 and 55 are both open to brake pipe pressure, and the spring 56 shifts the stem 47 to the right hand position of Fig. 1. Consequently, exhaust flow from the brake cylinder is not impeded at the valve 53.

*Service application*

Upon reduction of brake pipe pressure, the piston 28 moves to the left under predominating auxiliary reservoir pressure until arrested by stop 27. The parts assume positions indicated in Figs. 2 and 4. The brake cylinder and quick service chamber 41 are both disconnected from the exhaust. Cavity 67 connects the brake pipe quick service port 64 with the quick service chamber port 65. This expedites the service reduction and assures motion to service position. Spring 26 is strong enough to prevent over travel. Service port 69 registers with service port 59, and auxiliary reservoir air starts to flow to the brake cylinder at a rate determined by the constriction 71.

Connection of the brake pipe with the quick service chamber produces a definite and immediate drop of brake pipe pressure, and, since the piston 28 now stands between the ports 54 and 55, the left hand side of diaphragm 44 is subject to the lower brake pipe pressure, while the right hand side is subject to auxiliary reservoir pressure at substantially its normal value.

Figure 6:
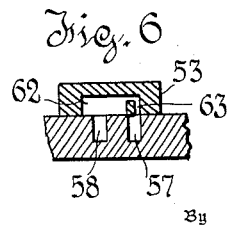
Fig. 6 is a fragmentary view showing the valve element of the gradient neutralizing valve in flow restricting position.

The diaphragm 44, therefore, shifts valve 53 to the left to the position shown in Fig. 6, in which the restricted extension 63 is interposed in the flow path through the service port to the brake cylinder. Consequently, brake cylinder pressure rises slowly and auxiliary reservoir pressure falls slowly.

For purposes of discussion it will be assumed that the volume of the quick service chamber 41 is such that it reduces brake pipe pressure approximately six pounds. The strength of spring 56 is assumed to be such that diaphragm 44 will be held to the left if auxiliary reservoir pressure predominates two pounds or more over brake pipe pressure. Accordingly, assuming a six pound service reduction, the valves 53 near the front of the train will remain in their left hand position while auxiliary reservoir pressure bleeds down four pounds.

On a long train in which there is a substantial brake pipe gradient, the valves toward the rear will remain in their restricting position a much shorter time, because there will be a smaller difference between initial auxiliary reservoir pressure and service brake pipe pressure. Consequently, the flow to the brake cylinders on different cars will be restricted for different periods of time, the period getting shorter and shorter from the front to the rear of the train. The difference in duration is a function of the pressure gradient which existed under running conditions. In the second reduction of brake pipe pressure in a split reduction application, the diaphragm 44 will not respond by moving to the left after it has returned to its normal right hand position, because there is no quick service drop and port 71 is large enough to reduce auxiliary reservoir pressure at a service rate.

*Emergency application*

If the engineer reduces brake pipe pressure at an emergency rate, the piston 28 moves to its extreme left hand position and seats on the gasket 29. Both ports 54 and 55 are subject to auxiliary reservoir pressure, so that the diaphragm 44 remains in its right hand position and free flow to the brake cylinder occurs. In emergency the right hand end of valve 37 clears the emergency port 61 (see Fig. 3). The valve 53 remains at the right in the position of Fig. 1.

The modified construction of Figs. 7–12, inclusive, contains all the elements described in Figs. 1–6, and the reference numerals for similar parts have been increased by 100. Hence, the body 115 corresponds to the body 15. There are certain modifications which can be briefly described.

The flange 116 is mounted against a filler piece 172 which, in turn, is mounted against the rear end of an auxiliary reservoir 173. The auxiliary reservoir connection 117 communicates through a passage 174 with the interior of the auxiliary reservoir 173. The brake cylinder passage 119 communicates through a passage 175 with the brake cylinder pipe 176. Brake pipe passage 118 communicates through passage 177 and the branch pipe 178 with the brake pipe 179.

The quick service chamber 141 is formed in the filler piece 172 instead of being formed in the body 115, but this is merely a matter of location. The brake pipe quick service port 164 in the seat for the slide valve 137 is formed with a lateral extension, as shown, and, instead of leading directly from the brake pipe passage 118, leads through a quick service limiting valve which will now be described.

This valve comprises a seat 181 and a yieldingly mounted valve 182 which is carried in the hub 183. The hub 183 carries a flange 184 between which and a companion disc 185 a flexible diaphragm 186 is clamped. A nut 187, threaded on an extension of hub 183, performs a clamping function, and the extension works in a guideway formed in cap 188, and thus serves to hold the hub 183 and valve 182 properly aligned.

The diaphragm 186 is clamped between the cap 188 and a portion of the body 115, and the space to the right of the diaphragm is connected by way of passage 189 and pipe 191 with a supplemental reservoir 192. The space to the left of the diaphragm 186 is at brake pipe pressure being in communication with a branch of the brake pipe passage 118. A loading spring 193 urges the diaphragm 186 to the right, and its strength is so chosen that the valve 182 will close against the seat 181 when brake pipe pressure falls a definite amount, say for example, six and a half pounds, below supplemental reservoir pressure.

The supplemental reservoir is charged concurrently with the auxiliary reservoir, and to the same pressure or substantially so. Since the supplemental reservoir is not drawn upon in service, a definite reduction of brake pipe pressure terminates quick service flow.

The recess 167 in slide valve 137 is formed with an extension 167a as well as with an extension 168, the effect being to provide for closing of the port 165 in release position (see Fig. 7).

The slide valve 137, in addition to the ports described with reference to the slide valve 37, has a through port 194 which is the emergency port and registers with port 161 in emergency. In the seat of the slide valve, there is an additional port 195 which communicates with the passage 189 and is, therefore, the supplemental reservoir port.

In emergency position, the slide valve 137 moves to the left far enough to expose the port 195, so that supplemental reservoir air, as well as auxiliary reservoir air, flows through the port 194 and port 161 to the brake cylinder.

There is also a supplemental reservoir charging port 196 which extends through the slide valve 137 from top to bottom, and which is controlled by the graduating valve 138. This port registers with port 195 in release position, and is then exposed at its upper end by the graduating valve 138. The passage which connects the quick service port 165 with the quick service chamber 141 has a branch which leads to a restricted vent choke 197, permitting slow flow to atmosphere, and to a check valve 198, which opens to permit flow to a port 199 in the seat of slide valve 153.

Slide valve 153 is formed with a cavity 201 which, in the right hand position of the valve, connects port 199 with a seat port 202, the seat port 202 being in direct communication with the seat port 157.

It follows from the construction just described that measuring chamber 141 is in restricted communication with the atmosphere, and that when valve 153 is in its right hand position, in which it permits free flow between the seat of slide valve 137 and the brake cylinder, the measuring chamber 141 and the brake cylinder are connected by way of check valve 198. The check valve so controls the flow that air may pass from the measuring chamber 141 to the brake cylinder, but may not flow from the brake cylinder to the chamber. When the valve 153 moves to the left to its flow restricting position, it disconnects port 199 from port 202.

The operation of the modified device is as follows:

*Release and recharge*

The auxiliary reservoir is charged through the charging groove 131, and the slide valve chamber is connected with the supplemental reservoir through port 196. After a service application, therefore, the supplemental reservoir assists in recharging the auxiliary reservoir until after the reservoir pressures are equalized, when the two are charged concurrently. The brake cylinder is connected to atmosphere. Quick service measuring chamber 141 bleeds to atmosphere through choke 197. The quick service limiting valve 182 will be held open. The gradient neutralizing valve will be shifted to its right hand position (Fig. 7) by the spring 156, since both sides of the diaphragm 144 are subject to brake pipe pressure.

Service application

Upon reduction of brake pipe pressure at a service rate, piston 128 moves until arrested by stop 127. This positions the parts in the position shown in Figs. 8 and 10. Port 164 is connected by extension 167a and cavity 167 with passage 165, so that brake pipe air flows to the quick service measuring chamber, charging the same, and a slow discharging flow commences through the choke port 197.

Since the piston 128 stands between the ports 154 and 155, diaphragm 144 is subject to brake pipe pressure on its left hand side, and auxiliary reservoir pressure on its right hand side, and quick service venting insures that the diaphragm will move to the left, overpowering spring 156 and shifting valve 153 to the position of Fig. 12.

From this it follows that the port 199 is blanked and that the throttling extension 163 is interposed in the path of flow through ports 171, 169 and 159 to the brake cylinder passage 119.

It is assumed that the quick service chamber is so proportioned that it produces a five pound reduction of brake pipe pressure, and that spring 193 is of such strength that diaphragm 186 will not close the quick service limiting valve until brake pipe pressure has dropped approximately six and a half pounds.

It follows from this arrangement that brake pipe pressure will be gradually reduced one and a half pounds by flow through the choke port 197. While this slow discharge is taking place, the auxiliary reservoir air is slowly flowing from the slide valve chamber 121 through the restricted service port 171, and thence through the restricted port 163 to the brake cylinder.

Before reduction of the auxiliary reservoir pressure causes the piston to shift the graduating valve to the right to lap the service port, the quick service limiting valve will terminate quick service venting flow, so that the brake pipe is then isolated from the quick service chamber, and the quick service chamber continues to be slowly vented. Thereafter, reduction of auxiliary reservoir pressure by flow to the brake cylinder will permit spring 156 to shift valve 153 to the right hand position (see Fig. 7) in which the restriction 163 becomes ineffective, and in which the measuring chamber 141 is connected through the check valve 198 with the brake cylinder.

After equalization of the brake cylinder and the measuring chamber, the check valve 198 prevents back flow and the choke port 197 completes the venting of the chamber 141.

In a long train in which a substantial pressure gradient exists in the brake pipe, the gradient neutralizing valve 153 on cars at the front end will remain in restricting position for a longer period than on cars at the rear of the train, because at the front of the train the auxiliary reservoir has a higher initial charge. Furthermore, quick service limiting valves 182 will close sooner at the forward end of the train than at the rear, for the reason that after quick service venting and because of the pressure gradient, there will be a flow from the front toward the rear of the train. Because of the earlier closure of the quick service limiting valve and the longer period in which the pressure gradient neutralizing valve remains in restricting position, the quick service chambers 141 at the forward portions of the train will be vented to atmosphere more nearly completely by flow through the choke ports 197 than will similar chambers at the rear of the train.

It follows that the build-up of brake cylinder pressure at the front of the train will be delayed over a longer period, and at the termination of this period there will be less pressure fluid available in the measuring chambers 141 to supplement brake cylinder pressure. Consequently, with the improved construction, the build-up of pressure in the brake cylinders at the forward portion of the train is more delayed and the pressure is augmented little, if at all, while at the rear of the train, the build-up is delayed only for a short period, and a major portion of the air vented in quick service is availed of to supplement brake cylinder pressure. Thus, the final service pressure in the cylinders is equalized, or more nearly equalized than would otherwise be the case.

Emergency application

In emergency application, the quick service limiting valve will close immediately. The spring 156 will hold the valve 153 in its right hand position, because both sides of the diaphragm 144 are subject to auxiliary reservoir pressure. Consequently, there is substantially no flow to the quick service measuring chamber, and the emergency flow from the supplemental reservoir and auxiliary reservoir to the brake cylinder is not delayed by the valve 153.

Generally stated, the operative principles described may be embodied in various specifically different triple valve structures. For example, there is nothing inherent in the inventive concept which precludes the use of restricted recharge or restricted release, or both, for example, by the conventional method using a retard stop. There are no necessary limitations on the form of the graduating valve, or its relation to the service ports. It is by no means essential that a supplemental reservoir be used, as a quick service limiting valve, if used, can be controlled by any volume charged to auxiliary reservoir pressure and retained charged during service, or by other means which will readily suggest themselves. To a certain extent, diaphragms and pistons are known equivalents for each other, and while I prefer to control the ports 154 and 155 by means of the triple piston, it is not strictly necessary that this specific control be used.

In certain of the claims defining a proportional relationship the term "directly" is used to exclude an inverse relationship, but without intention to limit the claims to precise mathematical proportion.

What is claimed is:—

1. The method of neutralizing the effect of pressure differentials between the charged pressures of the auxiliary reservoirs of automatic air brake units connected in a train by a brake pipe, such differentials being occasioned by leakage under running conditions; which consists in initiating a service application by establishing throughout the brake pipe a substantially uniform lowered pressure and temporarily restricting the flow of auxiliary reservoir air to the brake cylinders to less than the normal service rate for timed periods approximately proportional directly to the differentials between each initial auxiliary reservoir pressure and such lowered pressure.

2. The method of neutralizing the effect of pressure differentials between the charged pressures of auxiliary reservoirs of automatic air brake units connected in a train by a brake pipe, such differentials being occasioned by leakage under running conditions; which consists in initiating a service application by establishing throughout the brake pipe a substantially uniform lowered pressure, and temporarily restricting the flow of air from each auxiliary reservoir to the corresponding brake cylinder to less than the normal service rate until reservoir pressure falls to a uniform value higher than and determined by the uniform brake pipe pressure, and thereafter permitting free flow to the brake cylinders.

3. The method of neutralizing the effect of pressure differentials between the charged pressures of the auxiliary reservoirs of automatic air brake units connected in a train by a brake pipe, such differentials being occasioned by leakage under running conditions; which consists in initiating a service application by discharging measured quantities of air from the brake pipe at points corresponding to said auxiliary reservoirs throughout its length, and thereby establishing a substantially uniform lowered brake pipe pressure; locally confining the discharged air and permitting it to escape from such confinement at a slow rate; restricting the flow of auxiliary reservoir air to corresponding brake cylinders for time periods approximately proportioned to the differentials between each initial auxiliary reservoir pressure and such lowered brake pipe pressure; and at the termination of each such restriction period feeding to the brake cylinder the residual locally confined air.

4. The method of neutralizing the effect of pressure differentials between the charged pressures of auxiliary reservoirs of automatic air brake units connected in a train by a brake pipe, such differentials being occasioned by leakage under running conditions; which consists in initiating a service application by discharging measured quantities of air from the brake pipe at points corresponding to said auxiliary reservoirs throughout its length, and thereby establishing a substantially uniform lowered brake pipe pressure; locally confining the discharged air and permitting it to escape from confinement gradually; restricting the flow of auxiliary reservoir air from the various reservoirs to corresponding brake cylinders while auxiliary reservoir pressure falls from its initial value to a uniform value higher than and determined by the lowered brake pipe pressure; and upon attainment of said uniform value permitting free flow from the auxiliary reservoir to the brake cylinder and feeding to the brake cylinder residual locally confined air.

5. The method of neutralizing the effect of pressure differentials between the charged pressures of auxiliary reservoirs of automatic air brake units connected in a train by a brake pipe, such differentials being occasioned by leakage under running conditions; which consists in initiating a service application by discharging measured quantities of air from the brake pipe at points corresponding to said auxiliary reservoirs throughout its length, and thereby establishing a substantially uniform lowered brake pipe pressure; locally confining the discharged air and permitting it to escape from confinement gradually; permitting auxiliary reservoir air to flow gradually from each reservoir to the corresponding brake cylinder; and when auxiliary reservoir pressure attains a uniform value higher than and determined by the lowered brake pipe pressure, feeding to the brake cylinder the residual locally confined air.

6. The combination of a brake pipe; a brake cylinder; an auxiliary reservoir; a triple valve associated therewith; a valve controlling the rate of flow through said triple valve from said reservoir to the brake cylinder; pressure actuated means responsive to a preponderance of auxiliary reservoir over brake pipe pressure to move the last-named valve in a flow restricting direction; yielding means resisting such motion; and means controlled by said triple valve for rendering said controlling valve operative when the triple valve is in service application position.

7. The combination of a triple valve having a piston actuated by opposing brake pipe and auxiliary reservoir pressures; a valve controlling service flow and having a free-flow position and a restricted-flow position; yielding means urging said valve to said free-flow position; an abutment for actuating said valve; and means effective in service position of the triple valve to subject opposite sides of said abutment to brake pipe and auxiliary reservoir pressures, the latter acting to urge the abutment and valve toward flow restricting position.

8. The combination of a triple valve having a piston actuated by opposing brake pipe and auxiliary reservoir pressures; a valve controlling service flow and having a free-flow position and a restricted-flow position; yielding means urging said valve to said free-flow position; an abutment for actuating said valve; and means controlled directly by the triple piston and effective in the service position of the triple valve to subject opposite sides of said abutment to brake pipe and auxiliary reservoir pressures, the latter acting to urge the abutment and valve toward flow restricting position.

9. The combination of a triple valve having a brake pipe connection, a brake cylinder connection, and an auxiliary reservoir connection, said triple valve including a piston actuated valve mechanism which in release position effects charging of the auxiliary reservoir from the brake pipe and the exhaust of the brake cylinder, and in application positions closes said exhaust and connects the auxiliary reservoir with the brake cylinder; a secondary valve interposed between the triple valve and the brake cylinder connection, and having two positions, in one of which positions it restricts said communication as compared with the other position; a shiftable abutment connected to operate the last-named valve; yielding means urging said valve toward the non-restricting position; and means effective in service application position of the valve to subject said abutment to opposed brake pipe and auxiliary reservoir pressures in such manner that predominating auxiliary reservoir pressure tends to move said valve to said restricting position.

10. The combination of a triple valve having a brake pipe connection, a brake cylinder connection, and an auxiliary reservoir connection, said triple valve including a piston actuated valve mechanism which in release position effects charging of the auxiliary reservoir from the brake pipe and the exhaust of the brake cylinder, and in application positions closes said exhaust and connects the auxiliary reservoir with the brake cylinder; a secondary valve interposed between the triple valve and the brake cylinder connection and having two positions, in one of which positions it restricts said communication as compared with the other position; a shiftable abutment connected to operate the last-named valve; yielding means urging said valve toward the non-restricting position; means effective in service application position of the valve to subject said abutment to opposed brake pipe and auxiliary reservoir pressures in such manner that predominating auxiliary reservoir pressure tends to move said valve to said restricting position; and means rendered effective by motion of the triple valve to emergency application position to subject both sides of said abutment to the same pressure.

11. The combination of a triple valve having a brake pipe connection, a brake cylinder connection, and an auxiliary reservoir connection, said triple valve including a piston actuated valve mechanism which in release position effects charging of the auxiliary reservoir from the brake pipe and the exhaust of the brake cylinder, and in application positions closes said exhaust and connects the auxiliary reservoir with the brake cylinder; a secondary valve interposed between the triple valve and the brake cylinder connection, and having two positions, in one of which positions it restricts said communication as compared with the other position; a shiftable abutment connected to operate the last-named valve; yielding means urging said valve toward the non-restricting position; means effective in service application position of the valve to subject said abutment to opposed brake pipe and auxiliary reservoir pressures in such manner that predominating auxiliary reservoir pressure tends to move said valve to said restricting position; and means rendered effective by motion of the triple valve to emergency application position to subject both sides of said abutment to auxiliary reservoir pressure.

12. The combination of a triple valve having a brake pipe connection, a brake cylinder connection, and an auxiliary reservoir connection, said triple valve including a piston actuated valve mechanism which in release position effects charging of the auxiliary reservoir from the brake pipe and the exhaust of the brake cylinder, and in application position closes said exhaust and connects the auxiliary reservoir with the brake cylinder; a secondary valve interposed between the triple valve and the brake cylinder connection, and having two positions, in one of which positions it restricts said communication as compared with the other position; a shiftable abutment connected to operate the last-named valve; yielding means urging said valve toward the non-restricting position; and ports controlled by the triple piston, said ports leading to opposite sides of said abutment and being so located that the triple piston is positioned between them and exposes both when the triple valve is in service position.

13. The combination of a brake pipe; a brake cylinder; an auxiliary reservoir; a triple valve associated therewith, said triple valve including means for venting a definite quantity of air from the brake pipe as an incident to its service function; a valve controlling the rate of flow through said triple valve from said reservoir to said brake cylinder; pressure actuated means responsive to a preponderance of auxiliary reservoir pressure over brake pipe pressure to move the last-named valve in a flow restricting direction; yielding means resisting such motion; and means controlled by said triple valve for rendering said controlling valve effective when the triple valve is in service application position.

14. The combination of claim 13, further characterized in that said triple valve includes a piston working in a cylinder, and the means controlled by the triple valve for rendering said controlling valve operative comprises ports in said cylinder controlled by said piston.

15. The combination of a triple valve having a piston actuated by opposing brake pipe and auxiliary reservoir pressures, said valve having a quick service venting mechanism which insures the motion of said piston to service position and a yielding stop which insures arrest in said position; a valve controlling service flow through said triple valve and having a free flow position and a restricted flow position; yielding means urging such valve to said free flow position; an abutment for actuating said valve; and means rendered effective by said piston in service position to subject opposite sides of said abutment to brake pipe and auxiliary reservoir pressures, the latter acting to urge the abutment and valve to flow restricting position.

16. The combination of a triple valve having a triple piston working in a cylinder, of a flow controlling valve having restricting and non-restricting positions; an abutment connected to actuate said valve; and ports formed in said cylinder controlled by said piston and leading to opposite sides of said abutment.

17. The combination of a triple valve having a triple piston, of a secondary valve mechanism controlling flow through a port of a triple valve; an abutment for actuating said secondary valve; and ports controlled by said piston and leading to opposite sides of said abutment, said ports being connected both with the brake pipe when the triple valve is in release position, both with the auxiliary reservoir when the triple valve is in emergency position, and one with the brake pipe and the other with the auxiliary reservoir when the triple valve is in an intermediate position.

18. The combination of a brake pipe; a brake cylinder; an auxiliary reservoir; a triple valve associated therewith, said triple valve including a quick service vent mechanism including a measuring chamber and a restricted vent leading from said measuring chamber; a secondary valve mechanism which normally establishes a passage from said measuring chamber to the brake cylinder but may be shifted to interrupt said passage; yielding means urging said valve to its normal position; an abutment for actuating said valve; and means controlled by a portion of the triple valve mechanism for subjecting said abutment to the opposing pressures of the brake pipe and auxiliary reservoir when the triple valve is in service position.

19. The combination with the structure defined in claim 18, of a supplemental volume arranged to be charged under the control of said triple valve; an abutment subject to the opposing pressures in said supplemental volume and in the brake pipe; a valve actuated by said abutment and controlling flow from the brake pipe to said measuring chamber; and loading means serving to hold said valve open until brake pipe pressure is reduced a definite amount below the pressure in said supplemental volume.

20. The combination with the structure defined in claim 18, of a supplemental volume arranged to be charged under the control of said triple valve; an abutment subject to the opposing pressures in said supplemental volume and in the brake pipe; a valve actuated by said abutment and controlling flow from the brake pipe to said measuring chamber; and loading means for said valve arranged to hold said valve open until brake pipe pressure falls to a value substantially lower than that produced by venting of the brake pipe into said measuring chamber.

21. The combination of a brake pipe; a brake cylinder; an auxiliary reservoir; a triple valve associated therewith, said triple valve including a measuring chamber into which brake pipe air is vented in service and from which a restricted vent is afforded; a secondary valve associated with said triple valve and having a normal position in which it permits free flow from the auxiliary reservoir through the triple valve to the brake cylinder and flow from said measuring chamber to the brake cylinder, and an abnormal position in which it restricts the first-named flow and terminates the second-named flow; yielding means urging said valve toward its normal position; an abutment connected to actuate said valve; and means controlled by said triple valve and effective in service position to subject said abutment to opposing auxiliary reservoir and brake cylinder pressures.

22. The combination of claim 21, further characterized in that said triple valve includes a triple piston, and the means which subjects said abutment to opposing brake pipe pressure and auxiliary reservoir pressure in service position comprises ports controlled directly by the triple piston.

23. The combination with the structure defined in claim 21, of a supplemental volume charged from the brake pipe under control of the triple valve; an abutment subject to pressure in said supplemental volume and brake pipe pressure acting in opposition to each other; a valve actuated by said abutment and controlling flow from the brake pipe to said measuring chamber; and loading means for the last-named valve serving to hold it open until brake pipe pressure is reduced a definite amount below the pressure in said supplemental volume.

24. The combination with the structure defined in claim 21, of a supplemental volume charged from the brake pipe under control of the triple valve; an abutment subject to pressure in said supplemental volume and brake pipe pressure acting in opposition to each other; a valve actuated by said abutment and controlling flow from the brake pipe to said measuring chamber; and loading means serving to hold the last-named valve open until brake pipe pressure is reduced to a value lower than that secured by initial discharge from the brake pipe into said measuring chamber.

25. The combination of a triple valve and a flow controlling valve each arranged to be actuated by a pressure differential between an auxiliary reservoir and a brake pipe, said triple valve being adapted to move to service application position on the creation of a service differential between the auxiliary reservoir and the brake pipe pressures, in which position it feeds auxiliary reservoir air to a brake cylinder, and the flow controlling valve serving to regulate such flow to the brake cylinder and acting to restrict such flow when the service differential approximates a chosen maximum and to permit free flow when such service differential is low.

26. The combination of a triple valve and a flow controlling valve each arranged to be actuated by a pressure differential between an auxiliary reservoir and a brake pipe, said triple valve being adapted to move to service application position on the creation of a service differential between the auxiliary reservoir and the brake pipe pressures, in which position it feeds auxiliary reservoir air to a brake cylinder, and the flow controlling valve serving to regulate such flow to the brake cylinder and acting to restrict such flow when the service differential approximates a chosen maximum and to permit free flow when such service differential is low; and means for rendering said flow controlling valve mechanism inactive to restrict flow when said triple valve is in positions other than service position.

27. The combination of a triple valve of the quick service venting type, and a flow controlling valve, said triple valve and said controlling valve each being arranged to be actuated by differentials between auxiliary reservoir pressure and brake pipe pressure, said triple valve being moved by a service differential between such pressures to a service position in which it feeds air from the auxiliary reservoir to the brake cylinder, the service port through which such flow occurs being so proportioned that the resulting fall of auxiliary reservoir pressure will keep pace with the service reduction of brake pipe pressure but will not keep pace with the reduction of brake pipe pressure caused by quick service venting, the flow controlling valve serving to regulate flow from the auxiliary reservoir through the triple valve to the brake cylinder and acting to restrict such flow to less than normal value when the service differential approximates a chosen maximum, and to permit free flow when such service differential is low.

28. The combination of a triple valve of the quick service venting type, and a flow controlling valve, said triple valve and said controlling valve each being arranged to be actuated by differentials between auxiliary reservoir pressure and brake pipe pressure, said triple valve being moved by a service differential between such pressures to a service position in which it feeds air from the auxiliary reservoir to the brake cylinder, the service port through which such flow occurs being so proportioned that the resulting fall of auxiliary reservoir pressure will keep pace with the service reduction of brake pipe pressure but will not keep pace with the reduction of brake pipe pressure caused by quick service venting, the flow controlling valve serving to regulate flow from the auxiliary reservoir through the triple valve to the brake cylinder and acting to restrict such flow to less than normal value when the service differential approximates a chosen maximum, and to permit free flow when such service differential is low; and means for rendering said flow controlling valve mechanism inactive to restrict flow when said triple valve is in positions other than service position.

29. The combination of a triple valve of the quick service type, which functions in quick service to vent the brake pipe into a measuring chamber; and a flow controlling valve, said triple valve and said flow controlling valve being each arranged to be actuated by differentials between auxiliary reservoir pressure and brake pipe pressure, said triple valve being moved by a service differential between such pressures to a position in which it feeds air from the auxiliary reservoir to the brake cylinder, and the flow controlling valve being interposed in the path of flow from the auxiliary reservoir through the triple valve to the brake cylinder and serving when the service differential approximates a chosen maximum to restrict such flow and isolate said measuring chamber from the brake cylinder, and when such service differential is low to permit flow from the measuring chamber to the brake cylinder and free flow from the auxiliary reservoir to the brake cylinder.

30. The combination of a triple valve of the quick service type, which functions in quick service to vent the brake pipe into a measuring chamber; a flow controlling valve, said triple valve and said flow controlling valve being each arranged to be actuated by differentials between auxiliary reservoir pressure and brake pipe pressure, said triple valve being moved by a service differential between such pressures to a position in which it feeds air from the auxiliary reservoir to the brake cylinder, and the flow controlling valve being interposed in the path of flow from the auxiliary reservoir through the triple valve to the brake cylinder and serving when the service differential approximates a chosen maximum to restrict such flow and isolate said measuring chamber from the brake cylinder, and when such service differential is low to permit flow from the measuring chamber to the brake cylinder and free flow from the auxiliary reservoir to the brake cylinder; and means for rendering said flow controlling valve mechanism inactive when said triple valve is in positions other than service position.

31. The combination of a brake pipe; a brake cylinder; an auxiliary reservoir; a triple valve associated therewith; a flow-controlling valve having two positions, in one of which it permits a normal service rate of flow from the auxiliary reservoir to the brake cylinder through the triple valve, and in the other of which it permits a relatively restricted rate of such flow; and means effective while the triple valve is positioned to permit service flow to the brake cylinder and responsive to approach to equalization between auxiliary reservoir pressure and brake pipe pressure to shift said flow-controlling valve from the second-named to the first-named position.

CHARLES A. CAMPBELL.